United States Patent
Leinikki (10) Patent No.: US 9,573,667 B2
(45) Date of Patent: Feb. 21, 2017

(54) METHOD AND APPARATUS FOR PROVIDING USER ACCESS AND PROTECTION TO TOUCH SENSITIVE DEVICE UNDERWATER

(71) Applicant: Alleco Oy, Helsinki (FI)

(72) Inventor: Jouni Leinikki, Tervalampi (FI)

(73) Assignee: Alleco Oy, Helsinki (FI)

( * ) Notice: Subject to any disclaimer, the term of this patent is extended or adjusted under 35 U.S.C. 154(b) by 44 days.

(21) Appl. No.: 14/607,525

(22) Filed: Jan. 28, 2015

(65) Prior Publication Data

US 2015/0217843 A1    Aug. 6, 2015

(30) Foreign Application Priority Data

Jan. 31, 2014 (FI) ...................... 20145104

(51) Int. Cl.
 B63C 11/02 (2006.01)
 A45C 11/00 (2006.01)
 (Continued)

(52) U.S. Cl.
 CPC ............... B63C 11/02 (2013.01); A45C 11/00 (2013.01); A45C 11/22 (2013.01); G06F 1/1626 (2013.01);
 (Continued)

(58) Field of Classification Search
 None
 See application file for complete search history.

(56) References Cited

U.S. PATENT DOCUMENTS

| | | | |
|---|---|---|---|
| 3,236,167 | A | 2/1966 | Lode |
| 5,956,291 | A | 9/1999 | Nehemiah et al. |

(Continued)

FOREIGN PATENT DOCUMENTS

| | | |
|---|---|---|
| DE | 102012009039 A1 | 11/2013 |
| JP | 2013235533 A1 | 11/2013 |
| WO | 2012035021 A1 | 3/2012 |

OTHER PUBLICATIONS

European Search Report dated Jul. 6, 2015 for European Application No. 15151090.6-1972.

*Primary Examiner* — Viet Pham
*Assistant Examiner* — Christopher Kohlman
(74) *Attorney, Agent, or Firm* — Ziegler IP Law Group, LLC (57) ABSTRACT

An apparatus for protecting and providing user access to a touch sensitive device underwater, comprising a waterproof casing comprising an inner cavity configured to receive the touch sensitive device, the casing comprising: a first area of the casing for providing user access to the touch sensitive device; a transparent first membrane arranged to cover at least part of the first area of the casing, the inner cavity configured to receive the touch sensitive device so that user interface of the touch sensitive device being arranged adjacent to the membrane of the first area; a pressurized non-conductive fluid arranged to the inner cavity to provide a gap between the user interface of the touch sensitive device and the membrane; a pressure control membrane arranged to cover at least part of a second area of the casing; and a pressure control element operationally connected to the pressure control membrane, configured to flexibly bend the pressure control membrane to change pressure of the pressurized non-conductive fluid.

15 Claims, 9 Drawing Sheets

(51) Int. Cl.
*G06F 1/16* (2006.01)
*G06F 3/039* (2013.01)
*G06F 3/044* (2006.01)
*G06F 3/041* (2006.01)
*A45C 11/22* (2006.01)
*G06F 3/045* (2006.01)

(52) U.S. Cl.
CPC ........... *G06F 1/1643* (2013.01); *G06F 1/1656* (2013.01); *G06F 3/039* (2013.01); *G06F 3/044* (2013.01); *G06F 3/0416* (2013.01); *A45C 2011/002* (2013.01); *A45C 2011/003* (2013.01); *B63C 2011/021* (2013.01); *G06F 3/045* (2013.01); *G06F 2200/1633* (2013.01)

(56) References Cited

U.S. PATENT DOCUMENTS

| | | | |
|---|---|---|---|
| 2005/0110765 A1 | 5/2005 | Baeza | |
| 2012/0256867 A1* | 10/2012 | Annacone | ............... G06F 3/044 345/174 |
| 2013/0025904 A1 | 1/2013 | Berumen | |
| 2013/0027849 A1* | 1/2013 | Berumen | ............... A45C 11/00 361/679.01 |
| 2013/0113755 A1 | 5/2013 | Kwak | |
| 2014/0347867 A1* | 11/2014 | Chapman | ................ F16K 17/04 362/362 |

* cited by examiner

METHOD AND APPARATUS FOR PROVIDING USER ACCESS AND PROTECTION TO TOUCH SENSITIVE DEVICE UNDERWATER

TECHNICAL FIELD

The present application generally relates to a method and an apparatus for protecting and providing user access to a touch sensitive device underwater. The present application further relates to a casing comprised by the apparatus.

BACKGROUND ART

Particularly since the introduction of the scuba equipment, people are exploring underwater environments in great numbers.

Simultaneously, the increase in the number of those exploring underwater areas has triggered significant progress in diving-related technology. However, there are still areas, such as touch sensitive devices, in which significant needs still exist.

Known solutions exist where a touch-sensitive device is enclosed in a stiff or flexible waterproof casing.

If flexible casing is used, the underwater pressure may squeeze the casing against the touch sensitive surface and generating erroneous signals. If the touch sensitive device comprises a resistive touch element, the error signals are caused by the outer layer squeezing towards the inner layer due to the pressure and causing thus the electrical current to flow between the layers. In case the touch sensitive device comprises a capacitive touch element, the error signals are caused by the electric charge of the water layer adjacent to the touch sensitive element. In both cases, the usage of the touch-sensitive device underwater is difficult of even impossible.

If stiff casing is used, a display of the touch-sensitive device may be visible but the touch-sensitive element cannot be accessed through the stiff housing, even if it is transparent.

Further problems arise, when the touch-sensitive device is used in different depths causing different pressure towards the casing of the touch-sensitive device.

A solution is needed for providing an improved solution for allowing user access to touch-sensitive device underwater in different depths.

SUMMARY

According to a first example aspect of the invention there is provided an apparatus for protecting and providing user access to a touch sensitive device underwater, comprising:
  a waterproof casing comprising an inner cavity configured to receive the touch sensitive device, the casing comprising:
    a first area of the casing for providing user access to the touch sensitive device;
    a transparent first membrane arranged to cover at least part of the first area of the casing, the inner cavity configured to receive the touch sensitive device so that user interface of the touch sensitive device being arranged adjacent to the membrane of the first area;
    a pressurized non-conductive fluid arranged to the inner cavity to provide a gap between the user interface of the touch sensitive device and the membrane;
    a pressure control membrane arranged to cover at least part of a second area of the casing; and
    a pressure control element operationally connected to the pressure control membrane, the pressure control element configured to flexibly bend the pressure control membrane to change pressure of the pressurized non-conductive fluid.

In an embodiment, the pressure control element being user operable via a user controller.

In an embodiment, the pressure control element comprising an adjustable spring operationally connected between the pressure control membrane and the user controller.

In an embodiment, the adjustable spring configured to connect to the pressure control membrane and configured to flexibly bend the pressure control membrane to change pressure of the pressurized non-conductive fluid.

In an embodiment, the apparatus further comprising a cover part attached to the waterproof casing, defining a second cavity between the cover part and the pressure control membrane, configured to receive water through apertures within the cover part casing wall, wherein the user controller being attached to the cover part and the spring extending through the second cavity.

In an embodiment, the casing comprises stiff material.

In an embodiment, the gap between the user interface of the touch sensitive device and the membrane configured to comprise the pressurized non-conductive fluid and preventing electric charge of external water on the other side of the membrane to disturb the touch sensitive device.

In an embodiment, an additional pressure to the fluid being generated using an adjustable spring and a pressure control membrane.

In an embodiment, an additional pressure to the fluid being generated using at least one of the following:
  an adjustable spring and a pressure control membrane;
  a piston;
  a tension of the pressure control membrane being composed of a flexible material.

In an embodiment, the apparatus further comprises:
  an inlet, within the casing, for adding a non-conductive fluid to the inner cavity; and
  a pressure control element comprising a cap for the inlet, configured to operate using threads, rotate in different directions, and to move inwards and outwards within the inlet in relation to the casing, wherein when moving, the cap operating as a moving piston operationally connected to the pressure control membrane, and the cap configured to change pressure of the pressurized non-conductive fluid.

According to a second example aspect of the invention there is provided a method for protecting and providing user access to a touch sensitive device underwater, comprising:
  receiving a touch sensitive device within an inner cavity of a waterproof casing;
  arranging a first area of the casing for providing user access to the touch sensitive device;
  arranging a transparent first membrane to cover at least part of the first area of the casing, the inner cavity configured to receive the touch sensitive device so that user interface of the touch sensitive device being arranged adjacent to the membrane of the first area;
  arranging a pressurized non-conductive fluid to the inner cavity to provide a gap between the user interface of the touch sensitive device and the membrane;
  providing a pressure control membrane to cover at least part of a second area of the casing; and
  connecting a pressure control element operationally to the pressure control membrane, the pressure control element configured to flexibly bend the pressure control membrane to change pressure of the pressurized non-conductive fluid.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In an embodiment, an apparatus and a method is provided for protecting touch-sensitive device underwater using pressurized and non-conductive fluid.

In an embodiment, a waterproof casing comprises an inner cavity configured to receive the touch sensitive device and protecting the device from the external pressure and the water outside the casing.

In an embodiment, the touch-sensitive device may comprise at least 5" touch-sensitive display operated by the user underwater without an excess pressure generated by a gas inside the casing. Errors caused by the external pressure, buoyancy or flow of the water are minimized and a thinner membrane or thinner insulating layer (less than 5 mm) between the touch-sensitive element and the water may be utilized.

In an embodiment, a touch-sensitive device is used. The touch-sensitive device may comprise capacitive or resistive element.

In an embodiment, a waterproof casing comprises an inner cavity configured to receive the touch sensitive device, the casing comprising a first area of the casing for providing user access to the touch sensitive device. A transparent first membrane is arranged to cover at least part of the first area of the casing, the inner cavity configured to receive the touch sensitive device so that user interface of the touch sensitive device being arranged adjacent to the membrane of the first area. A pressurized non-conductive fluid is arranged to the inner cavity to provide a gap between the user interface of the touch sensitive device and the membrane. A pressure control membrane is arranged to cover at least part of a second area of the casing and a pressure control element is operationally connected to the pressure control membrane, configured to flexibly bend the pressure control membrane to change pressure of the pressurized non-conductive fluid.

The transparent first membrane is configured to provide a gap between a surface of the touch sensitive device and an internal surface of the first membrane. The gap and an inner cavity defined by the casing are filled with the non-conductive fluid. The fluid may be pressurized and the pressure may be adjustable using the pressure control element and the pressure control membrane.

The pressurized non-conductive fluid enables keeping the transparent first membrane separate from the touch sensitive surface, such as the surface of a touch sensitive display, independently of external water flow effect to an external surface of the transparent membrane.

Since a volume of the fluid remains constant independently from the external pressure caused by the external water, also the gap remains sufficient between the first transparent membrane and the touch sensitive element for operating the device. Thus there is no need to add more fluid to the inner cavity even if the depth the device is operated underwater is changed and the external pressure is changed correspondingly.

In the following description, like numbers denote like elements.

Figure 1:
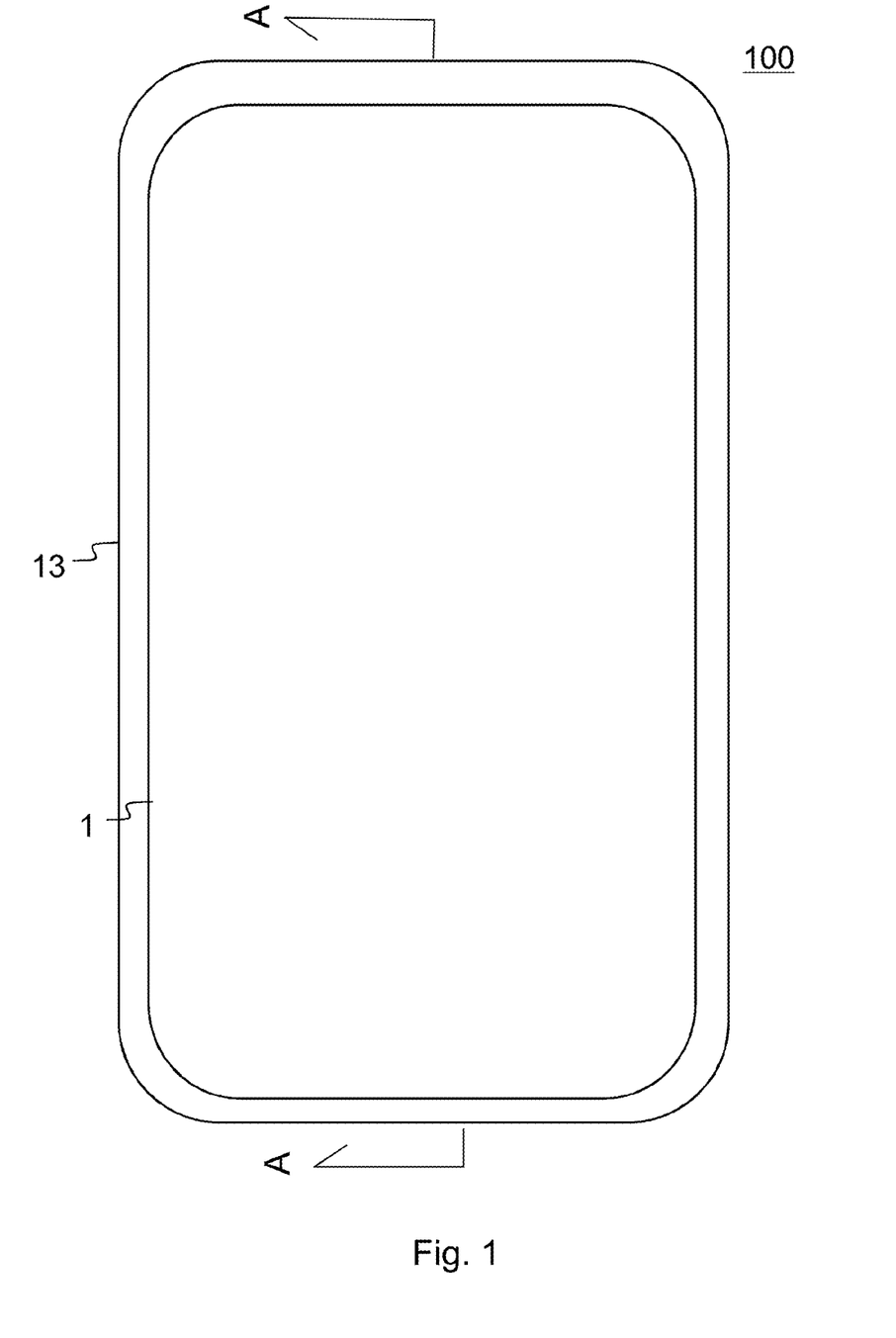
FIG. 1 shows a schematic picture of an apparatus according to an example embodiment of the invention.

FIG. 1 shows a schematic picture of an apparatus 100 comprising a casing 13 according to an example embodiment of the invention from a first side. The apparatus 100 is shown from front view that comprises a first area for a user access to a touch sensitive device 1, for example. A cutting plane A-A is shown.

Figure 2:
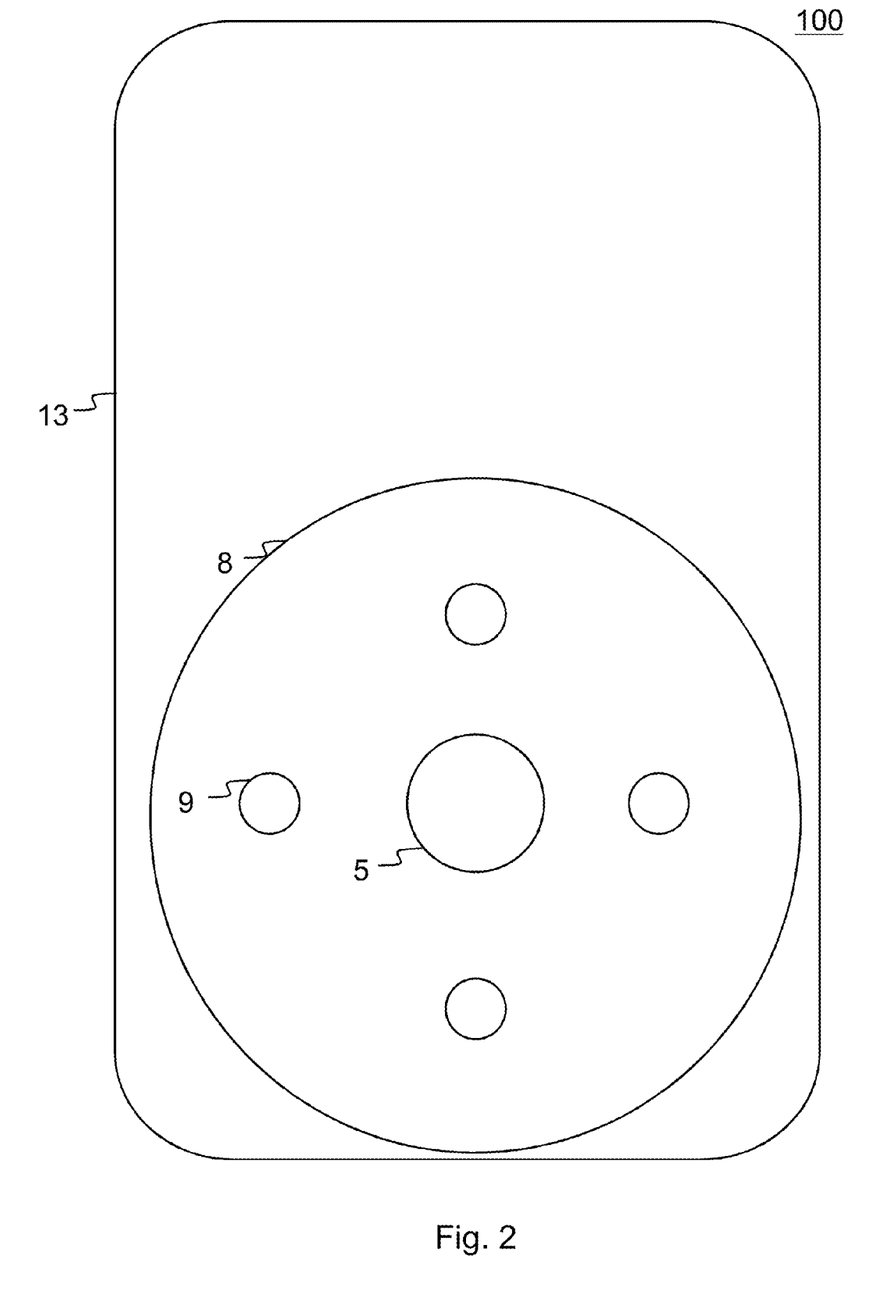
FIG. 2 shows a schematic picture of an apparatus according to an example embodiment of the invention from a second side.

FIG. 2 shows a schematic picture of an apparatus 100 comprising a casing 13 according to an example embodiment of the invention from a second side. The apparatus is shown from back view that comprises a second area for pressure control.

In an embodiment, an apparatus 100 for protecting and providing user access to a touch sensitive device underwater, comprises a waterproof casing 13 comprising an inner cavity configured to receive the touch sensitive device so that user interface of the touch sensitive device being arranged adjacent to a membrane of a first area. A pressurized non-conductive fluid is arranged to the inner cavity to provide a gap between the user interface of the touch sensitive device and the membrane. A pressure control membrane is arranged to cover at least part of a second area of the casing and a pressure control element 5 is operationally connected to the pressure control membrane, configured to the flexibly bend the pressure control membrane to change pressure of the pressurized non-conductive fluid.

In an embodiment, an inner cavity of the casing 13 is filled with non-conductive fluid and the casing comprises also a touch sensitive device. A pressure control element 5 is used to control a force of a spring that pushes a pressure control membrane towards the pressurized fluid. The spring is connected to the user controller of the control element 5 that is attached to a protective cover 8. External pressure affects the pressure control membrane through at least one aperture 9 within the protective cover 8. The pressurized fluid in the inner cavity of the casing 13 has higher pressure compared to the external pressure with a margin of the spring force.

Figure 3:
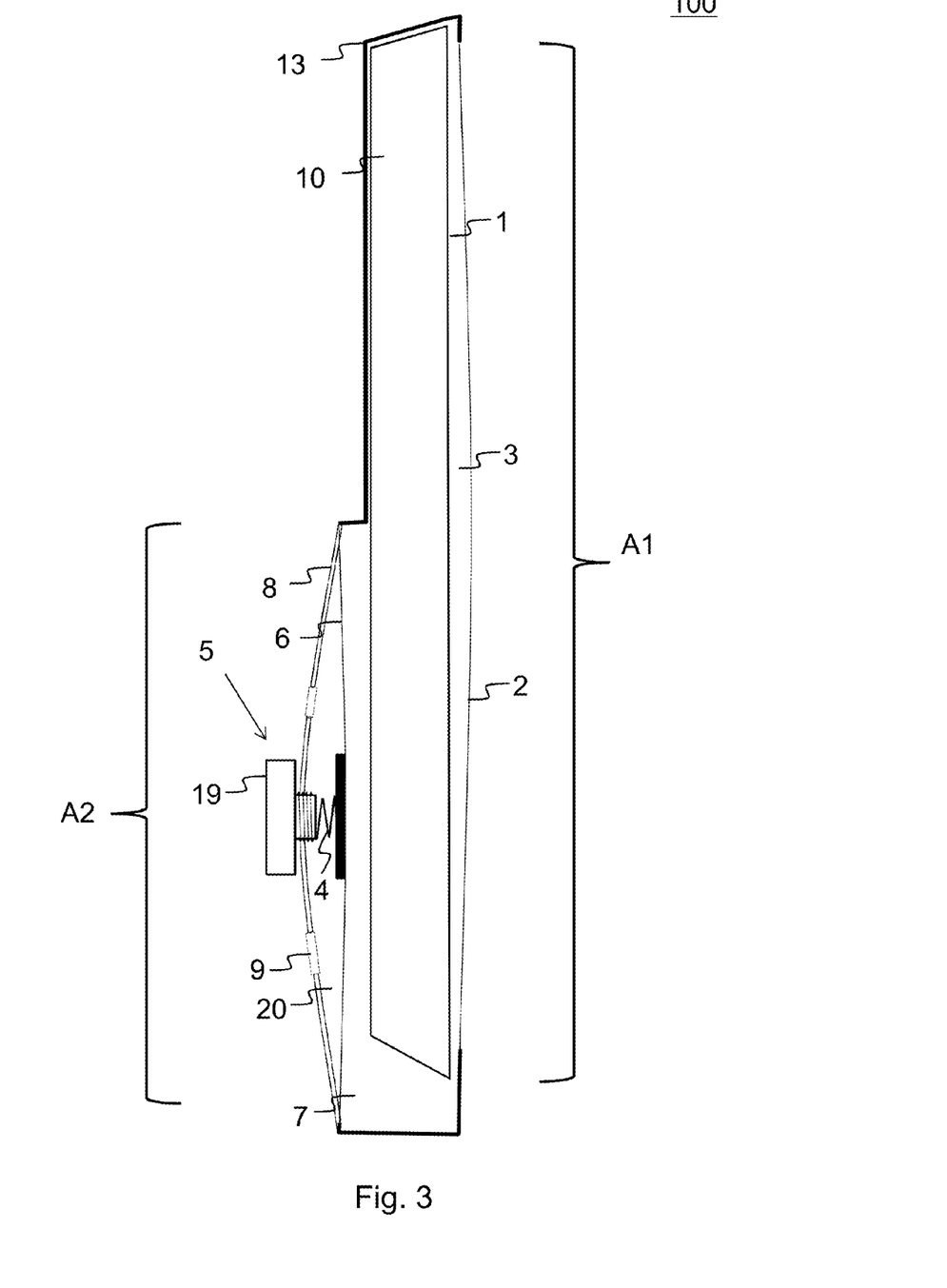
FIG. 3 presents a schematic view of an apparatus in which various embodiments of the invention may be applied.

FIG. 3 presents a schematic view of an apparatus 100 in which various embodiments of the invention may be applied. The apparatus is illustrated using the cutting plane A-A set in FIG. 1.

In an embodiment, an apparatus 100 is provided for protecting and providing user access to a touch sensitive device 10 underwater. The apparatus 100 comprises a waterproof casing 13 comprising an inner cavity 7 configured to receive the touch sensitive device 10. The casing 13 comprises a first area A1 of the casing 13 for providing user access to the touch sensitive device 10. A transparent first membrane 2 is arranged to cover at least part of the first area A1 of the casing 13, the inner cavity 7 configured to receive the touch sensitive device 10 so that user interface 1 of the touch sensitive device being arranged adjacent to the membrane 2 of the first area A1.

A pressurized non-conductive fluid is arranged to the inner cavity 7 to provide a gap 3 between the user interface 1 of the touch sensitive device 10 and the membrane 2. A pressure control membrane 6 is arranged to cover at least part of a second area A2 of the casing 13 and a pressure control element 5 comprising a user controller 19 and a spring 4 are operationally connected to the pressure control membrane 6. The pressure control element 5 is configured to flexibly bend the pressure control membrane 6 to change pressure of the pressurized non-conductive fluid within the inner cavity 7.

In an embodiment, the pressure control element 5 comprises an adjustable spring 4 operationally connected between the pressure control membrane 6 and the user controller 19.

In an embodiment, the adjustable spring 4 is configured to connect to the pressure control membrane 6 and configured to flexibly bend the pressure control membrane 6 to change pressure of the pressurized non-conductive fluid.

In an embodiment, the apparatus 100 further comprises a cover part 8 attached to the waterproof casing 13, defining a second cavity 20 between the cover part 8 and the pressure control membrane 6, configured to receive water through apertures 9 within the cover part 8 casing wall. The user controller 19 is attached to the cover part 8 and the spring 4 extends through the second cavity 20 from the user controller 19 to the pressure control membrane 6.

In an embodiment, the pressure control element 5 is controlled by the user using the user controller 19. In response to moving the user controller inwards or outwards, for example by rotating the controller 19, the spring 4 changes its force affected to the pressure control membrane 6. The pressure control membrane is flexibly bended in response to the spring 4 force inwards or in response to the internal pressure outwards, for example. The internal pressure may be caused also by the external pressure affecting the flexible membrane 2.

In an embodiment, the inner cavity 7 is filled with a non-conductive fluid and the fluid is in contact with both the first membrane 2 and the pressure control membrane 6. Thus the inner cavity 7 is defined by the casing 13 and the membranes 2, 6. The external pressure affects the pressure membrane 6 via the apertures 9. Thus the pressure of the fluid within the inner cavity 7 is bigger with an amount caused by the pressure control element 5 compared to the external pressure. The pressure difference caused by the pressure control element 5 is maintained and may be independent of the pressure changes of the external pressure. The external pressure typically changes when diving to a different depth underwater.

In an embodiment, due to the pressurized fluid in the inner cavity 7 a gap 3 between the touch sensitive element 1 and the flexible membrane 2 is maintained suitable for operation. In such situation, the underwater flow and buoyancy do not push the membrane 2 to touch the touch sensitive surface 1 of the device 10. Thus no error signals are generated. Using the pressure control element 5 via the user controller 19 the fluid pressure in the cavity 7 may be adjusted to desired level. Because the casing 13 forms a unitary volume for the non-conductive and incompressible fluid, the changes in external pressure do not affect the form of the casing 13 or the devices within the casing 13.

Figure 4:
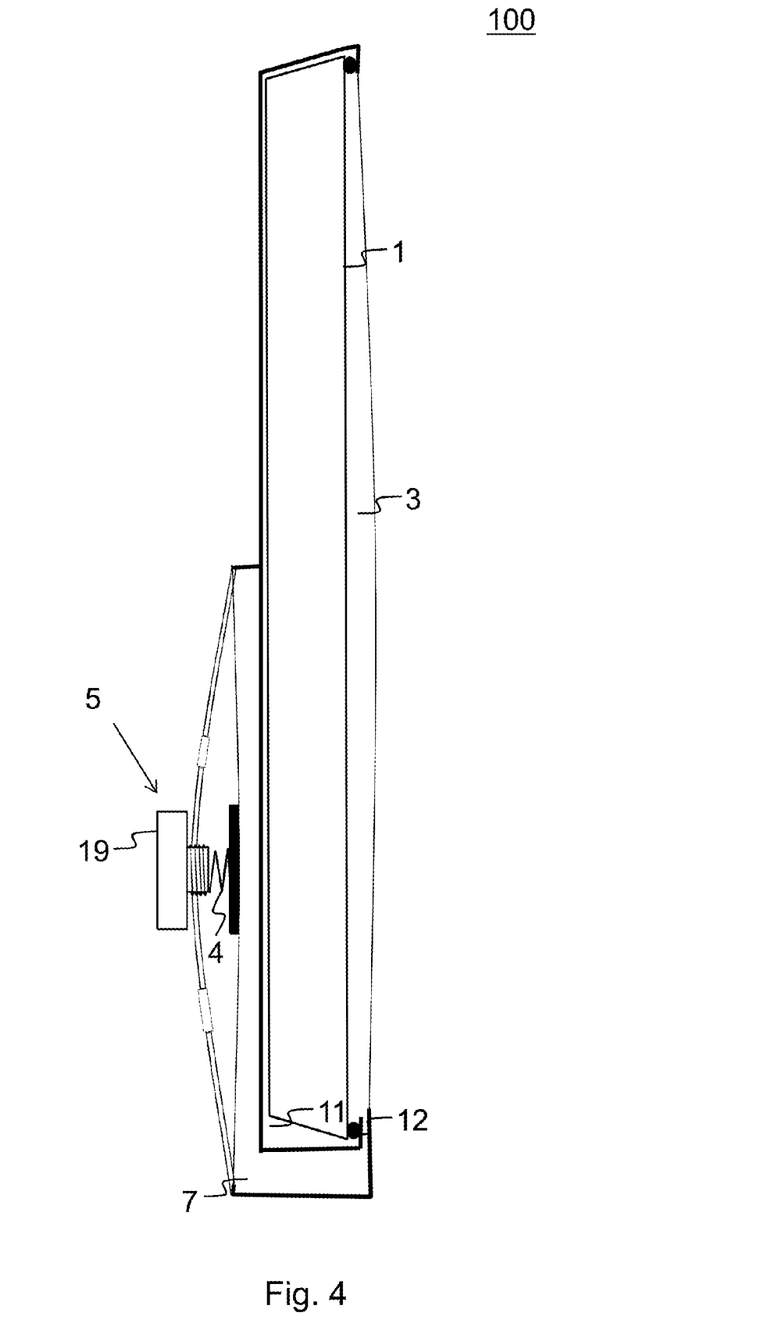
FIG. 4 presents a schematic view of an apparatus in which various embodiments of the invention may be applied.

FIG. 4 presents a schematic view of an apparatus 100 in which various embodiments of the invention may be applied. The apparatus is illustrated using the cutting plane A-A set in FIG. 1.

In an embodiment, the apparatus 100 comprises corresponding elements as illustrated in FIG. 3. However, in addition to that at least one gasket 12 is used. The pressure control element 5 operates as in FIG. 3 embodiment. However, only the inner cavity 3, 7 is filled with the non-conductive fluid and a second cavity 11 receiving the touch sensitive device 10 may comprise, for example, normal pressure air or other gas. The second cavity 11 is separated from the fluid cavity 3, 7 using the at least one gasket 12. In this embodiment, the external pressure affects the casing 13 and the touch sensitive element 1. Their strength may set limits for the underwater depth.

Figure 5:
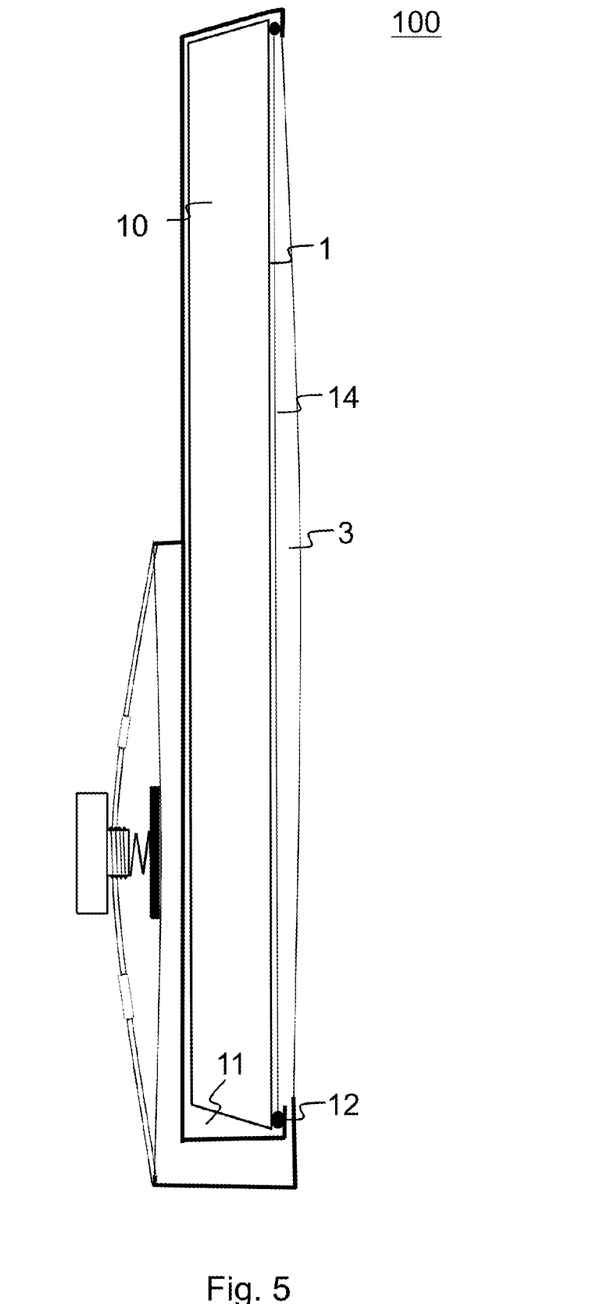
FIG. 5 presents a schematic view of an apparatus in which various embodiments of the invention may be applied.

FIG. 5 presents a schematic view of an apparatus 100 in which various embodiments of the invention may be applied. The apparatus is illustrated using the cutting plane A-A set in FIG. 1.

In an embodiment, the apparatus 100 comprises corresponding elements as illustrated in FIG. 4. However, in addition to that there is a protective film 14 arranged adjacent to the touch sensitive element 1. Thus, the touch sensitive element 1 may be kept intact from the pressurized fluid within the gap 3 and the inner cavity 7. The protective film 14 may be connected with the gasket 12 so that the second inner cavity 11 where the touch sensitive device 10 is received, may be kept intact from the fluid and the device 10 is not in contact with the fluid at all.

Figure 6:
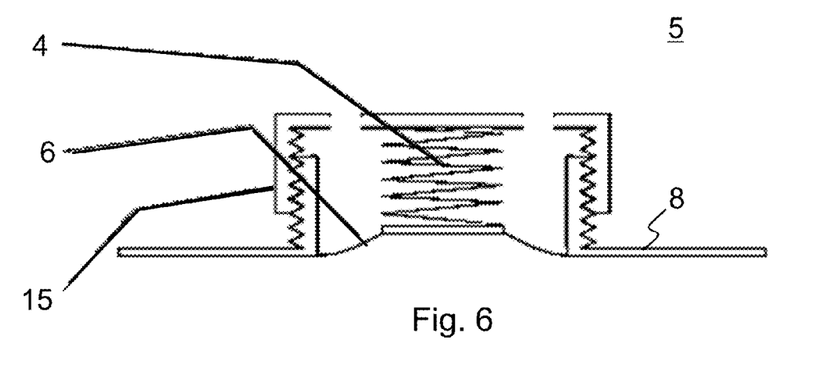
FIG. 6 presents a schematic view of a pressure control element in which various embodiments of the invention may be applied.

FIG. 6 presents a schematic view of a pressure control element 5 in which various embodiments of the invention may be applied.

In an embodiment, the pressure control element 5 comprises a rotatable user controller 15. The rotatable user controller 15 comprises screw thread matching to a counterpart thread of the protective cover part 8. The rotatable user controller 15 is configured to move in different directions in response to the user rotating the controller 15. When the user rotates the controller 15 in a first direction, the controller 15 moves inwards and pushes the spring 4 inwards also affecting the pressure control membrane 6. In response to the force created by the spring 4, the pressure of the fluid in the other side of the membrane 6 is changed. If the controller 15 is moved towards the membrane 6 the pressure is increased and if the controller is moved outwards from the membrane 6 the pressure is decreased.

Figure 7:
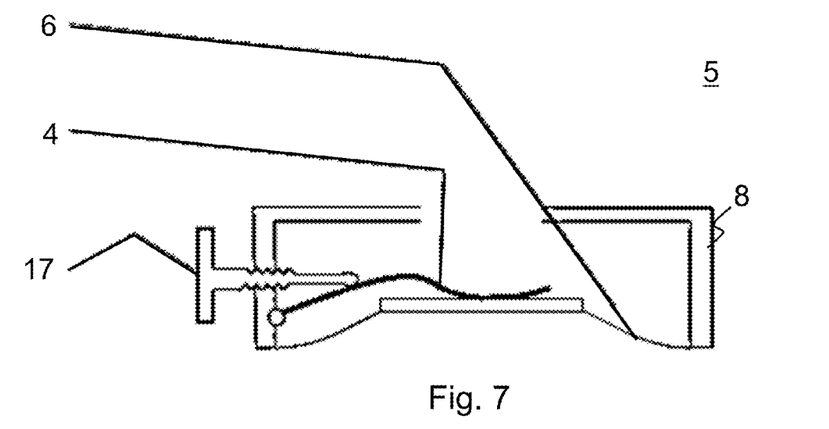
FIG. 7 presents a schematic view of a pressure control element in which various embodiments of the invention may be applied.

FIG. 7 presents a schematic view of a pressure control element 5 in which various embodiments of the invention may be applied.

In an embodiment, the pressure control element 5 comprises a rotatable user controller 15. The rotatable user controller 17 comprises screw thread matching to a counterpart thread of the protective cover part 8. The rotatable user controller 15 is configured to move in different directions in response to the user rotating the controller 15. When the user rotates the controller 15 in a first direction, the controller 15 moves inwards and pushes a leaf spring 4 inwards also affecting the pressure control membrane 6. In response to the force created by the leaf spring 4, the pressure of the fluid in the other side of the membrane 6 is changed. If the controller 15 is moved inwards the pressure is increased and if the controller 15 is moved outwards the pressure is decreased.

Figure 8:
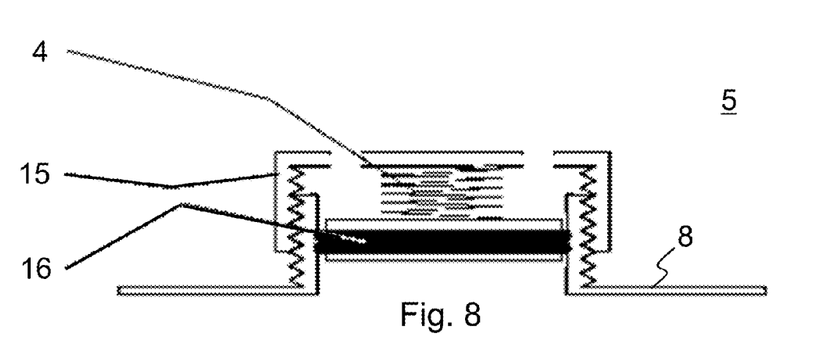
FIG. 8 presents a schematic view of a pressure control element in which various embodiments of the invention may be applied.

FIG. 8 presents a schematic view of a pressure control element 5 in which various embodiments of the invention may be applied.

In an embodiment, the pressure control element 5 comprises a rotatable user controller 15. The rotatable user controller 17 comprises screw thread matching to a counterpart thread of the protective cover part 8. The rotatable user controller 15 is configured to move in different directions in response to the user rotating the controller 15. When the user rotates the controller 15 in a first direction, the controller 15 moves inwards and pushes a spring 4 inwards. The spring is connected to a piston 16 that is configured to up and down within the hollow cylinder of the cover part 8. The spring 4 affects the pressure to the fluid of the inner cavity. Thus the piston 16 may replace the pressure control membrane. In response to the force created by the spring 4, the pressure of the fluid in the other side of the piston 16 is changed. If the controller 15 is moved inwards the pressure is increased and if the controller 15 is moved outwards the pressure is decreased.

Figure 9:
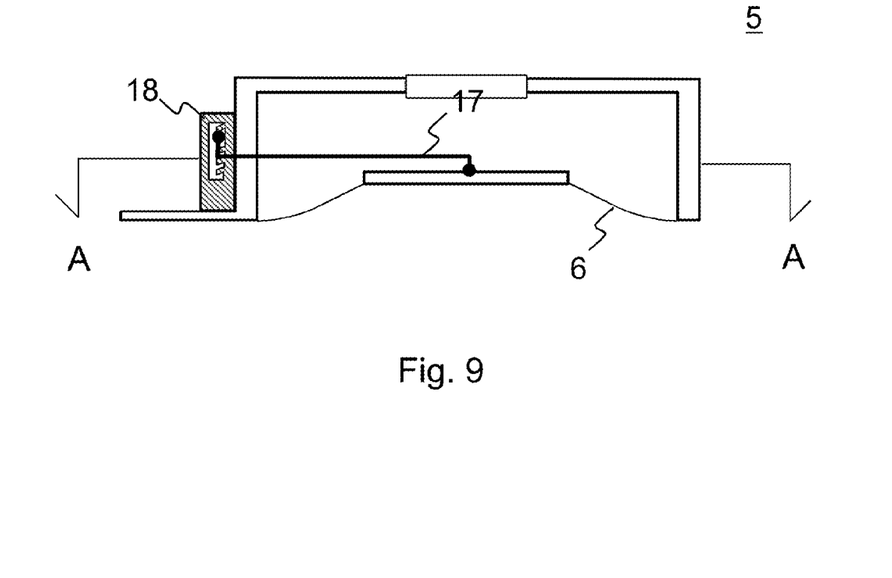
FIG. 9 presents a schematic view of a pressure control element in which various embodiments of the invention may be applied.

FIG. 9 presents a schematic view of a pressure control element 5 in which various embodiments of the invention may be applied.

In an embodiment, the pressure control element 5 comprises a user controller 17. The user controller 17 comprises a movable arm spring connected from first end to a pressure control membrane 6 and from second end to a control part 18. The control part may comprise a plurality of grooves that the user controller second end may be placed to provide different forces to the membrane 6. A cutting plane A-A is shown.

A resilient arm 17 pushes the pressure control membrane 6 or a piston 16 of FIG. 8 creating together with the external pressure, an overpressure to the fluid on the other side of the pressure control membrane. The spring force may be adjusted using the different grooves of the control part 18, for example, by moving the arm 17 up/down to different groove slots.

Figure 10:
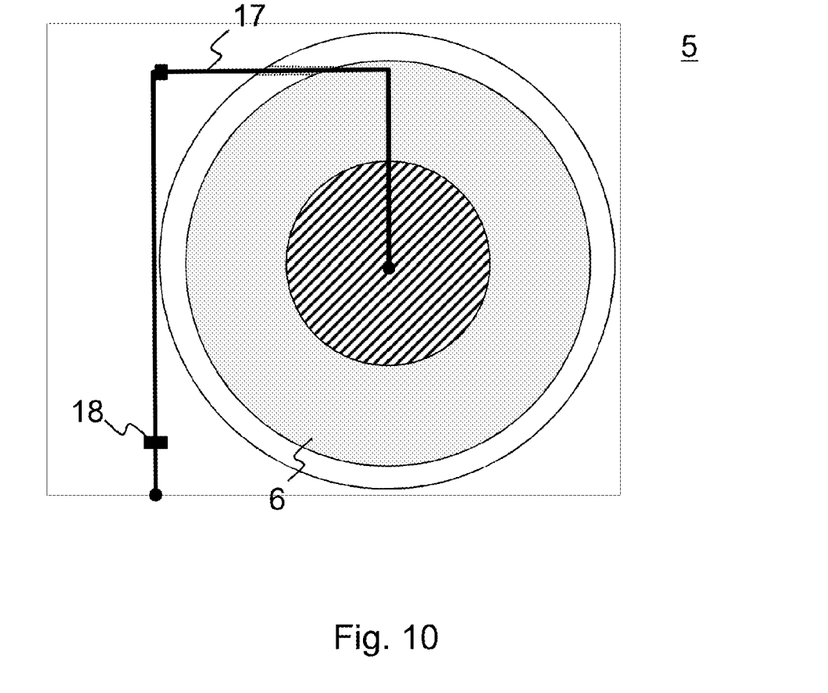
FIG. 10 presents a schematic view of a pressure control element in which various embodiments of the invention may be applied.

FIG. 10 presents a schematic view of a pressure control element 5 in which various embodiments of the invention may be applied. The apparatus is illustrated using the cutting plane A-A set in FIG. 9.

Figure 11:
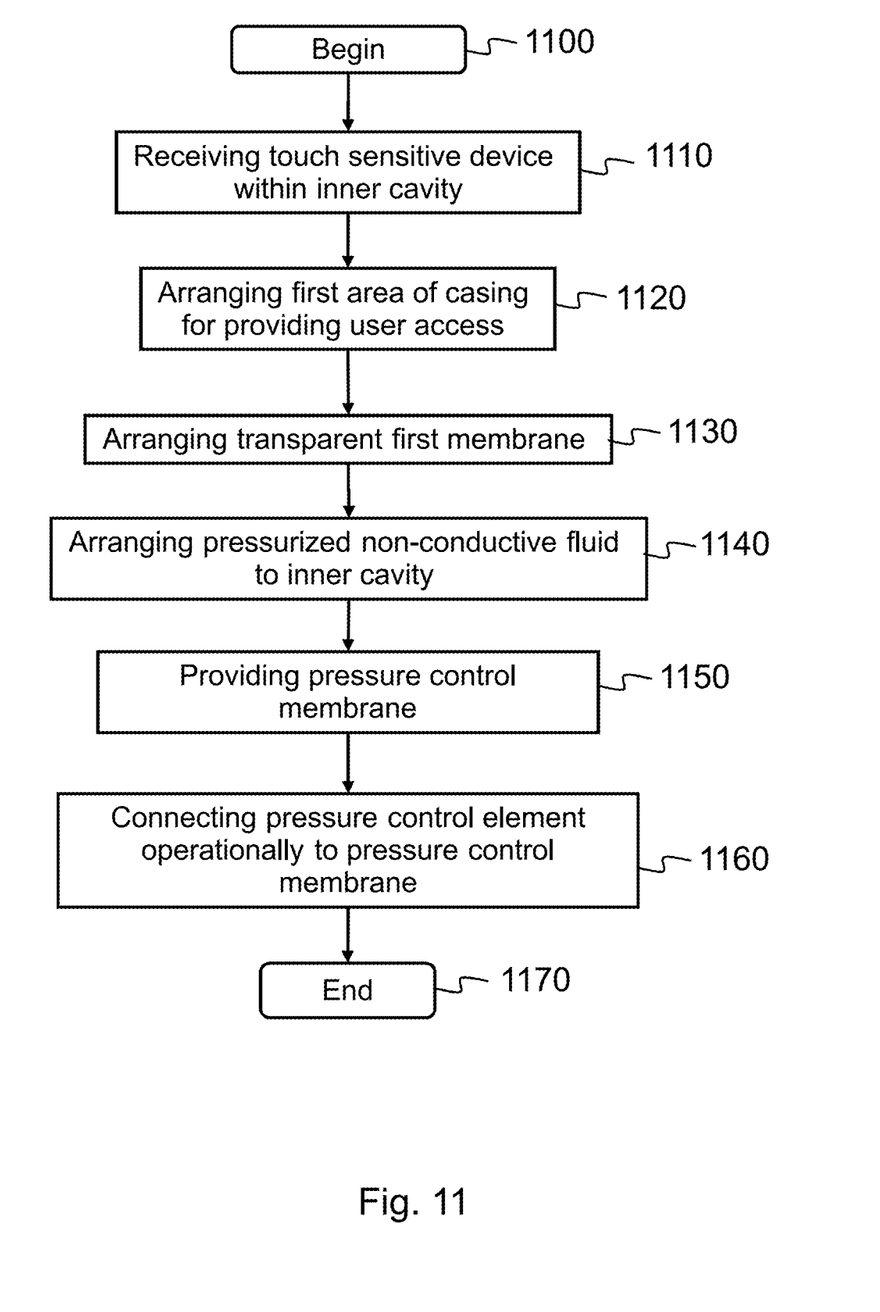
FIG. 11 shows a flow diagram showing operations in accordance with an example embodiment of the invention.

FIG. 11 shows a flow diagram showing operations in accordance with an example embodiment of the invention.

In step 1100 a method for protecting and providing user access to a touch sensitive device underwater is started. In step 1110, a touch sensitive device is received within an inner cavity of a waterproof casing. In step 1120, a first area of the casing is arranged for providing user access to the touch sensitive device. In step 1130, a transparent first membrane is arranged to cover at least part of the first area of the casing, the inner cavity configured to receive the touch sensitive device so that user interface of the touch sensitive device being arranged adjacent to the membrane of the first area. In step 1140, a pressurized non-conductive fluid is arranged to the inner cavity to provide a gap between the user interface of the touch sensitive device and the membrane. In step 1150, a pressure control membrane is provided to cover at least part of a second area of the casing. In step 1160, a pressure control element is operationally connected to the pressure control membrane, the pressure control element configured to flexibly bend the pressure control membrane to change pressure of the pressurized non-conductive fluid. In step 1170, the method is ended.

In an embodiment, when a user presses a membrane 2 with a finger or some other touch element, the membrane is bended towards the touch sensitive surface 1. Such movement reduces the volume between the touch sensitive surface 1 and the membrane 2. When the finger is removed the membrane returns and the original volume is achieved.

The pressure control element 5 operates in such a way that between the non-conductive fluid arranged in the inner cavity 7 and the external of the apparatus 100 is at least one of a membrane 6 or a moving piston 16. A total pressure is created comprising the external pressure combined with the additional pressure created by the pressure control element 5.

The membrane 6 or the piston 16 transfers the total pressure to the non-conductive pressurized fluid within the inner cavity 7 creating a gap 3 between the membrane 2 and the touch sensitive surface.

If filling the total inner cavity with the fluid, the external pressure reduced effect and the touch sensitive device 10 may be operated in different depths underwater.

In an embodiment, a resistive type touch sensitive device can operate under high external pressure. The incompressible fluid may fill also the cavity between conductive layers of the resistive type touch sensitive device, such as a resistive touch screen.

The non-conductive pressurized fluid may comprise at least one of the following: mineral oil, silicone oil, and organic oil.

The transparent membrane 2 may comprise at least one of the following materials: polycarbonate, polyvinylchloride, and polyurethane.

The pressure control membrane 6 may comprise at least one of the following materials: natural rubber, silicone rubber, and polybutadiene.

Figure 12:
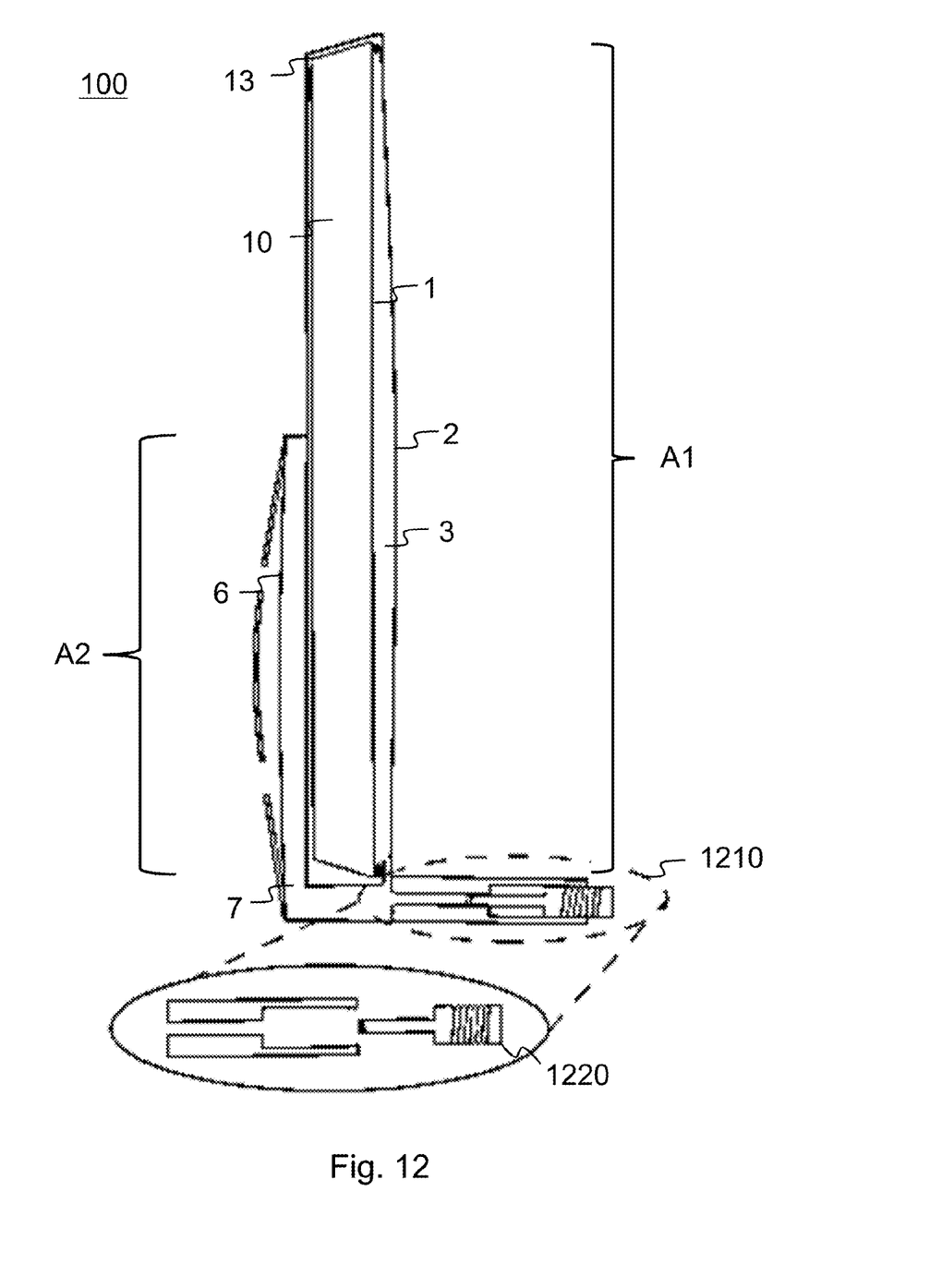
FIG. 12 presents a schematic view of an apparatus in which various embodiments of the invention may be applied.

FIG. 12 presents a schematic view of an apparatus 100 in which various embodiments of the invention may be applied. The apparatus is illustrated using the cutting plane A-A set in FIG. 1.

In an embodiment, an apparatus 100 is provided for protecting and providing user access to a touch sensitive device 10 underwater. The apparatus 100 comprises a waterproof casing 13 comprising an inner cavity 7 configured to receive the touch sensitive device 10. The casing 13 comprises a first area A1 of the casing 13 for providing user access to the touch sensitive device 10. A transparent first membrane 2 is arranged to cover at least part of the first area A1 of the casing 13, the inner cavity 7 configured to receive the touch sensitive device 10 so that user interface 1 of the touch sensitive device being arranged adjacent to the membrane 2 of the first area A1.

A pressurized non-conductive fluid is arranged to the inner cavity 7 to provide a gap 3 between the user interface 1 of the touch sensitive device 10 and the membrane 2. A pressure control membrane 6 is arranged to cover at least part of a second area A2 of the casing 13.

In an embodiment, an additional pressure is generated to the non-conductive fluid within the inner cavity 7 of the casing 13. In the casing 13, there is an inlet 1210 for adding the fluid to the inner cavity 7. A cap 1220 of the inlet 1210 is configured to operate using threads and rotating in different directions either inwards or outwards from the casing 13. When moving, the cap 1220 at the same time operates as a moving piston and increasing or decreasing the additional pressure created by the cap movement. The additional pressure thus created pushes the transparent membrane 2 outwards from the touch sensitive surface 1 and providing a gap 3 there between. Thus the external water does not cause any errors for the device operation.

In an embodiment, when the gap 3 reaches its maximum distance from the touch sensitive surface 1, a second membrane 6 bends outwards. The tension of the second membrane 6 maintains the pressure within the fluid. When the transparent membrane 2 is pushed, the fluid within the gap that is reduced moves to other parts of the inner cavity. Thus, the second membrane 6 bends outwards. When the pushing of the transparent membrane 2 is ended, the fluid returns and the gap 3 is back to the same size as before pushing.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus for protecting and providing user access to a touch sensitive device underwater, comprising:
    a waterproof casing comprising an inner cavity configured to receive the touch sensitive device, the casing comprising:
        a first area of the casing for providing user access to the touch sensitive device; and
        a transparent first membrane arranged to cover at least part of the first area of the casing, and the inner cavity being configured to receive the touch sensitive device so that user interface of the touch sensitive device being arranged adjacent to the membrane of the first area;
    wherein the apparatus further comprising:
        a pressurized non-conductive liquid fluid arranged to the inner cavity to provide a gap between the user interface of the touch sensitive device and the membrane;
        a pressure control membrane arranged to cover at least part of a second area of the casing; and
        a pressure control element operationally connected to the pressure control membrane, the pressure control element configured to flexibly bend the pressure control membrane to change pressure of the pressurized non-conductive liquid fluid.

2. The apparatus of claim 1, wherein the pressure control element being user operable via a user controller.

3. The apparatus of claim 2, wherein the pressure control element comprising an adjustable spring operationally connected between the pressure control membrane and the user controller.

4. The apparatus of claim 3, wherein the adjustable spring configured to connect to the pressure control membrane and configured to flexibly bend the pressure control membrane to change pressure of the pressurized non-conductive liquid fluid.

5. The apparatus of claim 4, further comprising a cover part attached to the waterproof casing, defining a second cavity between the cover part and the pressure control membrane, configured to receive water through apertures within the cover part casing wall, wherein the user controller being attached to the cover part and the spring extending through the second cavity.

6. The apparatus of claim 2, wherein the pressure control element comprises a rotatable user controller.

7. The apparatus of claim 6, wherein the rotatable user controller comprises screw thread matching to a counterpart thread of a protective cover part.

8. The apparatus of claim 7, wherein the rotatable user controller is configured to move in different directions in response to the user rotating the controller.

9. The apparatus of claim 8, wherein when the controller is rotated in a first direction, the controller is configured to move inwards and to push the spring inwards affecting the pressure control membrane, and in response to a force created by the spring, the pressure of the liquid fluid in other side of the membrane is changed.

10. The apparatus of claim 9, wherein when the controller is configured to move towards the membrane the pressure is increased, and when the controller is configured to move outwards from the membrane the pressure is decreased.

11. The apparatus of claim 1, wherein the casing comprising stiff material.

12. The apparatus of claim 1, wherein the gap between the user interface of the touch sensitive device and the membrane configured to comprise the pressurized non-conductive liquid fluid and preventing electric charge of external water on the other side of the membrane to disturb the touch sensitive device.

13. The apparatus of claim 12, wherein an additional pressure to the liquid fluid being generated using at least one of the following:
    an adjustable spring and a pressure control membrane;
    a piston; and
        a tension of the pressure control membrane being composed of a flexible material.

14. The apparatus of claim 1, further comprising:
an inlet, within the casing, for adding a non-conductive liquid fluid to the inner cavity; and
a pressure control element comprising a cap for the inlet, configured to operate using threads, rotate in different directions, and to move inwards and outwards within the inlet in relation to the casing, wherein when moving, the cap operating as a moving piston configured to change pressure of the pressurized non-conductive liquid fluid.

15. A method for protecting and providing user access to a touch sensitive device underwater, comprising:
receiving a touch sensitive device within an inner cavity of a waterproof casing;
arranging a first area of the casing for providing user access to the touch sensitive device;
arranging a transparent first membrane to cover at least part of the first area of the casing, the inner cavity configured to receive the touch sensitive device so that user interface of the touch sensitive device being arranged adjacent to the membrane of the first area;
arranging a pressurized non-conductive liquid fluid to the inner cavity to provide a gap between the user interface of the touch sensitive device and the membrane;
providing a pressure control membrane to cover at least part of a second area of the casing; and
connecting a pressure control element operationally to the pressure control membrane, the pressure control element configured to flexibly bend the pressure control membrane to change pressure of the pressurized non-conductive liquid fluid.

* * * * *